(12) United States Patent
Sexton

(10) Patent No.: US 7,135,507 B2
(45) Date of Patent: Nov. 14, 2006

(54) METALLIC INK AND CAPILLARY MARKER

(75) Inventor: Martin N. Sexton, Villa Park, IL (US)

(73) Assignee: Sanford, L.P., Freeport, IL (US)

( * ) Notice: Subject to any disclaimer, the term of this patent is extended or adjusted under 35 U.S.C. 154(b) by 0 days.

(21) Appl. No.: 10/298,719

(22) Filed: Nov. 18, 2002

(65) Prior Publication Data

US 2003/0129015 A1 Jul. 10, 2003

Related U.S. Application Data

(60) Provisional application No. 60/332,897, filed on Nov. 19, 2001.

(51) Int. Cl.
   *C09D 11/16* (2006.01)
   *C08L 39/00* (2006.01)
   *B43K 8/06* (2006.01)
(52) U.S. Cl. ............. 523/161; 524/548; 524/593; 401/198
(58) Field of Classification Search ........... 523/160, 523/161; 106/31.6; 524/548, 593
   See application file for complete search history.

(56) References Cited

U.S. PATENT DOCUMENTS

| | | | |
|---|---|---|---|
| 3,942,903 A | 3/1976 | Dickey et al. | 401/198 |
| 4,218,251 A | 8/1980 | Sanders | 106/30 |
| 4,296,176 A | 10/1981 | Lennon et al. | 428/407 |
| 4,496,258 A | 1/1985 | Tanaka et al. | 401/206 |
| 4,545,819 A | 10/1985 | Shioi et al. | 106/23 |
| 4,657,591 A | 4/1987 | Shioi et al. | 106/23 |
| 5,274,025 A * | 12/1993 | Stockl et al. | 524/513 |
| 5,340,388 A | 8/1994 | Breton et al. | 106/22 |
| 5,344,670 A | 9/1994 | Palmer et al. | 427/157 |
| 5,344,872 A * | 9/1994 | Debord et al. | 524/513 |
| 5,443,628 A | 8/1995 | Loria et al. | 106/20 |
| 5,474,603 A | 12/1995 | Miyashita et al. | 106/25 |
| 5,651,627 A | 7/1997 | Dowzall et al. | 401/199 |
| 5,762,694 A | 6/1998 | Yokoi et al. | 106/31.65 |
| 5,813,787 A | 9/1998 | Dowzall et al. | 401/199 |
| 5,971,646 A | 10/1999 | Chavatte et al. | 401/199 |
| 6,077,338 A * | 6/2000 | Wallstrom | 106/31.6 |
| 6,171,381 B1 * | 1/2001 | Yoshimura et al. | 106/31.6 |
| 6,210,063 B1 | 4/2001 | Isobe et al. | 401/273 |
| 6,224,284 B1 | 5/2001 | Sukhna et al. | 401/198 |
| 6,254,297 B1 | 7/2001 | Frazier | 401/133 |
| 6,402,412 B1 | 6/2002 | Sukhna et al. | 401/198 |
| 6,561,713 B1 | 5/2003 | Sukhna et al. | 401/198 |
| 6,616,741 B1 * | 9/2003 | Sawa et al. | 106/31.68 |
| 6,706,103 B1 * | 3/2004 | Yoshimura et al. | 106/31.6 |
| 2001/0019682 A1 | 9/2001 | Sukhna et al. | 401/198 |
| 2003/0144375 A1 * | 7/2003 | Wu et al. | 523/160 |

FOREIGN PATENT DOCUMENTS

| | | |
|---|---|---|
| EP | 0 761 785 A2 | 3/1997 |
| EP | 987304 A1 * | 3/2000 |
| EP | 1 118 643 A1 | 7/2001 |
| JP | 2000-129188 | 5/2000 |
| SU | 653317 | 8/1978 |
| WO | 0 001 778 A1 | 1/2000 |

OTHER PUBLICATIONS

Viscosity Conversion Table, Norcross Corporation (2005).*
Dri Mark Products Inc. v. National Ink Inc. and Dixon Ticonderoga Co., 01 Civ. 6541 (HB), 2002 U.S. Dist. LEXIS 6361 (S.D.N.Y. Apr. 11, 2002).
"Data Sheet W6" regarding BYK-P 105, published by Byk Chemie, Germany, dated Jan. 2000, four pages.

* cited by examiner

*Primary Examiner*—Callie Shosho
(74) *Attorney, Agent, or Firm*—Marshall, Gerstein & Borun LLP

(57) ABSTRACT

An ink including an aqueous dispersion of a metallic pigment and a film-forming resin, optionally together with one or more of a pH-adjusting agent, a color agent, a linking agent, an anti-settling agent, and a preservative, is disclosed. A marking instrument, particularly suitable for use with an ink according to the invention, and including a low-density reservoir for storing ink joined in capillary coupling relation to a porous nib, is also disclosed.

26 Claims, 2 Drawing Sheets

METALLIC INK AND CAPILLARY MARKER

CROSS-REFERENCE TO RELATED APPLICATION

The benefit under 35 U.S.C. §119(e) of U.S. Provisional Patent Application Ser. No. 60/332,897 filed Nov. 19, 2001, is hereby claimed.

BACKGROUND OF THE INVENTION

1. Field of the Invention

The invention generally relates to capillary action marking instruments and inks used therein. More particularly, the invention relates to capillary action markers employing an aqueous metallic ink.

2. Brief Description of Related Technology

Writing instruments for dispensing metallic inks have typically employed a hollow reservoir filled with free-flowing ink and mechanical means for mixing the ink to disperse the metallic particles. Without means to mix the metallic particles in the ink, the particles would tend to settle out of the liquid and clog the nib or lead to irregular dispensation. After mixing, the writing tip (nib) of the instrument would be repeatedly saturated with ink by opening a valve in the marker between the nib and the reservoir as the nib was depleted of ink. Such instruments are expensive, complicated to assemble, tedious in their operation, and prone to unreliability.

Another type of writing instrument for dispensing metallic ink via capillary action from a fiber reservoir has been disclosed; however, this writing implement is severely limited to construction with particular materials and limited by particular inks that can be used therewith.

SUMMARY OF THE INVENTION

It is an objective of the invention to overcome one or more of the problems described above.

Accordingly, one aspect of the invention is an ink including an aqueous dispersion of a metallic pigment and a film-forming resin, optionally together with one or more of a pH-adjusting agent, a color agent, a linking agent, an anti-settling agent, and a preservative.

Another aspect of the invention is a marking instrument including a low-density reservoir for storing ink joined in capillary coupling relation to a porous nib, and optionally containing a metallic ink according to the invention.

Further aspects and advantages of the invention may become apparent to those skilled in the art from a review of the following detailed description, taken in conjunction with the appended claims. While the invention is susceptible of embodiments in various forms, described hereinafter are specific embodiments of the invention with the understanding that the disclosure is illustrative, and is not intended to limit the invention to the specific embodiments described herein.

DETAILED DESCRIPTION OF THE INVENTION

Figure 1:
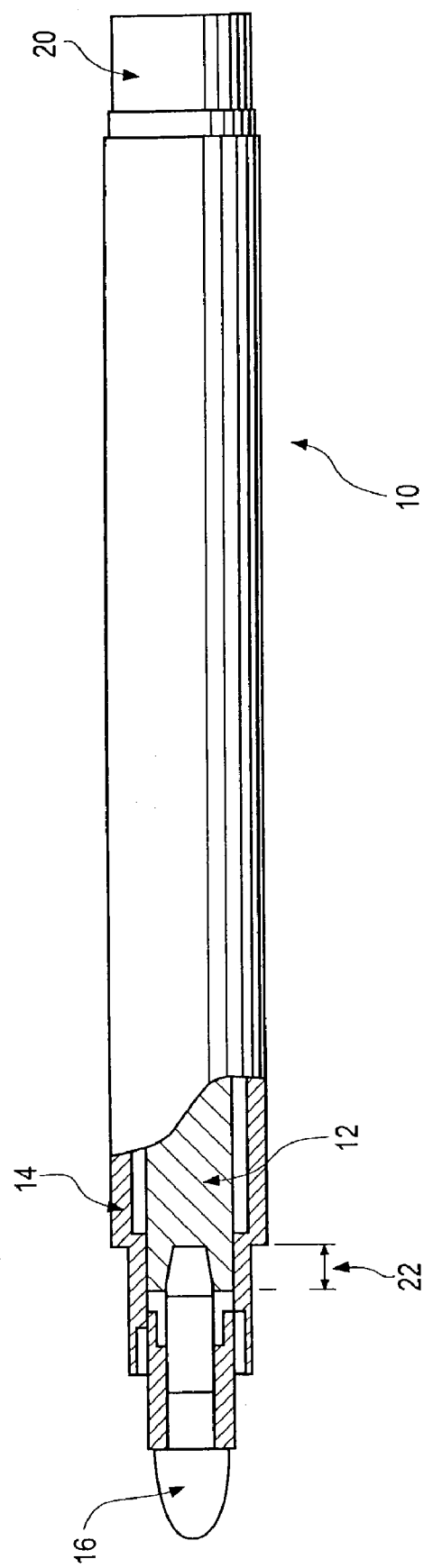
FIG. 1 is a partially cut-away view of an example of a marker according to the invention including a reservoir coupled by capillary action to a nib.

The invention is directed to a metallic ink useful in capillary-action marking instruments (also referred to herein as markers) and to a capillary-action marker optionally containing a metallic ink.

Thus, one aspect of the invention is an ink that includes an aqueous dispersion of a metallic pigment and a film-forming resin. The metallic pigment can be a leafing (typically flaked) or non-leafing type. When a leafing pigment is used, the ink forms a layer of pigment parallel to the surface of the substrate, and is preferred when a highly-opaque mark with high metallic luster is desired (e.g., for use on dark paper). When a non-leafing pigment is used, the ink yields a less opaque mark with more of a glitter effect. A metallic pigment preferably is a metal pigment selected from the group consisting of aluminum, copper, bronze, oxides thereof, anodizes thereof (e.g., to provide an iridescent finish), and combinations of any of the foregoing. Suitable metal pigments are available from MD-Both Industries of West Chicago, Ill. The metallic pigment is also defined to include other lustrous substances that can provide a metallic or iridescent appearance, such as pearlescent agents (e.g., bismuth oxychloride (BiOCl)), which can be used in addition to, or instead of, a metal pigment.

The metal pigment preferably has a particle size (e.g., an average particle size) less than about 15 µm, or in a range of about 2 µm to about 15 µm, more preferably in a range of about 5 µm to about 12 µm, for example about 5 µm to about 9 µm. The metal pigment preferably is included in an ink in a range of about 7.5 wt. % to about 20 wt. %, preferably about 5 wt. % to about 15 wt. % when a coloring agent is used. A preferred aluminum pigment for use in an ink according to the invention that provides a leafing effect is sold as "non-leafing" aluminum powder NPW 2900 (or Aquamet NPW 2900) by MD-Both Industries, and has a nominal average particle diameter of 10 µm.

The film-forming resin used in an ink according to the invention functions to assist in dispersing the metallic particles in the aqueous vehicle and in drawing the metallic particles with the aqueous vehicle as the ink is drawn to the tip via capillary action and dispensed upon marking (e.g., writing). Suitable film-forming resins include water-soluble resins such as hydantoin-formaldehyde co-polymers, e.g., dimethylhydantoin-formaldehyde (DMHF) and 5,5-dimethylhydantoin formaldehyde polymer (also called 5,5-dimethyl-2,4-imidazolidinedione). A preferred dimethyl hydantoin-formaldehyde film-forming resin is sold as a 75% aqueous solution by Ele-Pelron of Lyons, Ill., under the trade name DANTOIN 739 (CAS# 26811-08-5; 5,5-dimethylhydantoin formaldehyde polymer (also called 5,5-dimethyl-2, 4-imidazolidinedione)); DMHF resin is also available from Lonza, Inc. of Fairlawn, N.J. Other resins for use in an ink of the invention include polyvinyl alcohol and water-borne urethane polymers such as NEOREZ brand polymers (e.g., NEOREZ R-940, R-960, R-962, R-966, and R-967) sold by Zeneca Resins of Wilmington, Mass. The film-forming resin preferably is included in an ink in a range of about 10 wt. % to about 40 wt. %, and preferably about 7 wt. % to about 20 wt. % when a coloring agent is used. The ratio of pigment (metallic and color pigment, if used) to resin is in a preferred range of about 0.2 to 0.6, more preferably about 0.6.

Optionally, and preferably, a pH-adjusting (e.g., buffering) agent is added to the ink to maintain the pH of the ink neutral to slightly alkaline, e.g., in a range of about 6 to about 9, preferably about 7 to about 8. Preferred pH-adjusting agents for use in an ink according to the invention include triethanol amine and aminomethyl propanol (e.g., sold as a 5% water solution under the trade name AMP-95 by Dow Chemical Company of Midland, Mich.). Without intending to be bound by any particular theory, either of triethanol amine and aminomethyl propanol, when used, may also aid in the dispersion of pigments. When used, a pH-adjusting agent preferably is included in an ink in a range of about 0.25 wt. % to about 2 wt. %.

When the ink is desired to provide a color other than the base color provided by the metal pigment, then a color agent can be added. Suitable color agents include organic pigments and dyes such as acid dyes, direct dyes, disperse dyes, and solvent dyes. Suitable organic pigments include phthalo blues (e.g., copper phthalocyanine), phthalo greens (e.g., chlorinated copper phthalocyanine), diarylide yellows (e.g., diarylanilide yellow; $C_{32}H_{26}Cl_2N_6O_4$), naphthol reds (e.g., azophloxine), and dioxazine violets (e.g., carbazole violet; $C_{34}H_{22}Cl_2N_4O_2$), for example. Such organic pigments are readily available as pre-dispersed mixtures with water as a carrier.

When a color agent is added to the ink to tint the metallic pigment, then preferably an organic pigment is used and a linking agent is added to the dispersion to associate the color with the metallic pigment. Preferred organic pigments are available under the trade name HOSTAFINE by Clariant International of Coventry, R.I., and are provided as 30 wt. % to 40 wt. % solids pre-dispersed in an aqueous vehicle reported to include nonionic dispersing and wetting agents and glycol. For example, HOSTAFINE Yellow HR pigment can be used with an aluminum metallic pigment and, preferably, a suitable linking agent, to provide a metallic pigment that appears gold. When used, a color agent preferably is included in an ink in a range of about 2 wt. % to about 30 wt. %, more preferably about 7 wt. % to about 25 wt. %.

A suitable linking agent will associate a color agent with a metallic pigment particle to override preferential absorption of the pigment by the substrate to be marked (e.g., paper). For example, a linking agent having a polar end and a non-polar end can link a non-polar pigment to a polar metal surface (e.g., the metallic pigment). Preferred linking agents are selected from a group consisting of amphiphilic copolymers, multifunctional carbodiimides, phosphoric acid salts, and combinations thereof. A suitable amphiphilic copolymer (having both hydrophobic and hydrophilic units) is a poly(vinylpyrrolidone/acrylates/lauryl methacrylate) sold under the trade name STYLEZE 2000 (CAS # 831 by International Specialty Products of Wayne, N.J. A preferred multifunctional carbodiimide is sold under the trade name UCARLNK XL-29SE by Union Carbide Corp. of Danbury, Conn. Monoethanolamine phosphate is a preferred phosphoric acid salt. Other agents useful in promoting adherence of organic pigments to metallic substrates (e.g., agents used in inks for printing on metallized films) may also be useful in an ink according to the invention.

An anti-settling agent, used in very small quantities, can aid in the stability of the ink without affecting the performance of the marker and the marking quality of the ink. Preferably, an anti-settling agent is present in the ink in a range of about 0.001 wt. % to about 0.01 wt. %, preferably about 0.003 wt. % to about 0.006 wt. %. A preferred anti-settling agent for use in an ink as described herein is xanthan gum, used in a preferred range of about 0.003 wt. % to about 0.006 wt. %.

A preservative (e.g., a fungicide and/or bactericide) is preferably added to the ink formulation. A preferred preservative for use in an ink according to the invention is a 9.3% solution of active ingredient 1,2-benzisothiazolin-3-one (BIT; CAS #2634-33-5), with sodium hydroxide and dipropylene glycol sold under the trade name PROXEL GXL by ICI Americas, Inc., of Wilmington, Del. When used, a preservative preferably is included in an ink in a range of about 0.05 wt. % to about 0.15 wt. %.

The film-forming resin, metallic pigment, water, and optional additives will be added in amounts sufficient to provide an ink with the desired color(s) and stability, and with a suitable viscosity for operation in a capillary action marker. Preferably, the ink will have a viscosity of at least about 2.5 centipoise (cP) and less than about 80 cP, more preferably about 3 cP to about 30 cP, most preferably about 3 cP to about 14 cP, to deter settling of components.

An ink according to the invention can be prepared by thoroughly blending the film-forming resin, metallic pigment, water, and optional additives until a homogenous mixture is formed.

A marker according to the invention generally comprises a reservoir for storing ink joined in capillary coupling relation to a porous nib. FIG. 1 is a partially cut-away view of an example of a marker 10 according to the invention including a reservoir 12 disposed in a barrel 14 and coupled by capillary action to a nib 16. The barrel 14 is sealed by a plug 20, which can aid in keeping the reservoir in place. By capillary coupling it is meant that the reservoir and nib are disposed in such a manner to permit transfer of ink between the reservoir and nib via capillary action, for example at a coupling zone 22, such that a change in pressure (either at the nib or in the reservoir) can pull ink across an interface between the two elements. Preferably, a marker according to the invention includes an ink according to the invention and a porous acrylic fiber nib.

The reservoir can be constructed of a large-porosity or low-density material, preferably low-density fiber material, such as low-density polyester fiber. The reservoir should have sufficient porosity to prevent substantial filtering of the particulate pigment as the ink is drawn out of the reservoir. The voids in the reservoir preferably have substantially linear pathways because a tortuous pathway can contribute to holdup and filtering of the particulate pigment. The density of a reservoir, such as a fiber reservoir, can serve as an approximation of the degree of porosity of the reservoir. Preferably, the density of the reservoir is less than about 1 gram per cubic centimeter ($g/cm^3$), more preferably less than about 0.5 $g/cm^3$, for example about 0.10 $g/cm^3$. When a metal pigment having a preferred particle size of about 7 μm to about 12 μm is used, then the reservoir preferably has a density less than about 0.3 $g/cm^3$, more preferably in the range of about 0.25 $g/cm^3$ to about 0.07 $g/cm^3$, for example about 0.10 $g/cm^3$. When a fiber is used, the fiber will preferably have a denier-per-fiber (dpf) value less than 5, more preferably in a range of about 1 dpf to about 3 dpf, for example about 2.3 dpf. The reservoir material can be modified (e.g., plasma or corona treatment) to provide a desired surface energy. Suitable polyester fiber reservoirs are available under the trade name TRANSORB XPE from Filtrona Richmond, Inc., of Richmond, Va.

The size and shape of the reservoir is limited, in part, by the physical dimensions of the marking instrument. In one preferred embodiment suitable for use in a conventional-sized cylindrical marker for hand application, the reservoir preferably is about 5 mm to about 15 mm in diameter and about 70 to about 120 mm in length. A reservoir according to the invention can be provided with an outer wrapper to assist in defining the shape of the reservoir and provide convenience in handling characteristics. Thus, for example, a low-density polyester fiber reservoir can be wrapped in a plastic (e.g., polypropylene) film to define a cylindrical shape wherein at least one end of the reservoir is exposed (i.e., not covered by the wrapper). The invention is not limited to the use of any particular size or shape of reservoir, and other suitable reservoir sizes and shapes can be selected by a person of ordinary skill in the art.

The reservoir preferably includes an aqueous dispersion of a metal pigment and a film-forming resin, optionally together with one or more of a pH-adjusting agent, a color agent, a linking agent, an anti-settling agent, and a preservative. In preferred marker embodiments, the reservoir includes a metallic ink as disclosed herein.

The nib preferably is constructed of porous, substantially linear acrylic fiber. Acrylic nibs have outstanding solvent resistance, a hard writing touch, good abrasion resistance, and are particularly suited for use with an ink according to the invention. The nib is sufficiently porous to provide an ink path that will not substantially filter the particles in the ink. Preferably, the porosity of the nib is in a range of about 55% by volume to about 80% by volume of voids. When using a metallic pigment with a nominal average particle size in the range of about 7 µm to about 12 µm, the nib preferably has a porosity in a range of about 57% by volume to about 73% by volume of voids, more preferably about 65% by volume to about 70% by volume of voids, most preferably about 68% by volume to about 70% by volume of voids. Suitable high porosity, substantially linear acrylic fiber materials for use as nibs are available from Teibow Hanbai Co., Ltd. of Tokyo, Japan under the designation CE348S and from Aubex Corp. of Tokyo, Japan under the designation WA49R.

Use of an acrylic nib in a marker according to the invention ensures adequate function and useful service life of the article by promoting chemical compatibility and suppressing blockage of the capillary passages at the surface of the nib via filtration of large pigment particles. The size and shape of the nib will be limited, in part, by the size and shape of the reservoir and by practical considerations. Thus, for example, the writing end of the nib can have a chisel-point shape, useful for making broad or narrow marks. The opposite end of the nib, which is disposed in capillary coupling relation to the reservoir (i.e., at the coupling zone 22 in FIG. 1), preferably is smaller in cross-sectional dimension (e.g., diameter) than the reservoir.

The coupling zone (e.g., element 22 in FIG. 1) is preferably very large, to maximize capillary coupling between the nib and the reservoir. Thus, in one embodiment of the invention, the shape of the nib and the reservoir at the coupling zone are selected such that a large area of the coupling-zone end of the nib is exposed to (preferably, in contact with) the reservoir. For example, the end of the nib exposed to the reservoir can be provided with a taper (e.g., cone-shaped) so that a large fraction of the cross-sectional area of the nib is exposed to the reservoir for capillary coupling.

Figure 2:
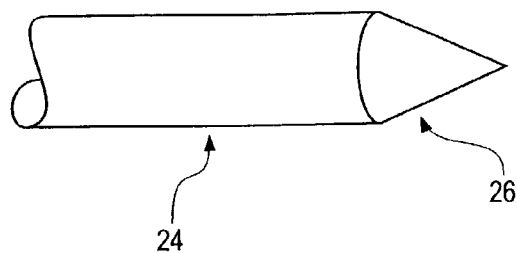
FIG. 2 is an elevation view of a coupling zone-end of a cone-end nib having a cone-shaped coupling portion.

Alternative examples of coupling zone-end nib configurations are depicted in FIGS. 2 to 6. FIG. 2 is an elevation view of a coupling zone-end of a cone-end nib 24 having a cone-shaped (i.e., pencil tip-shaped) coupling portion 26 which is exposed to the reservoir. In this configuration, the coupling portion 26 can be about 1 cm to about 2.5 cm in length, for example.

Figure 3:
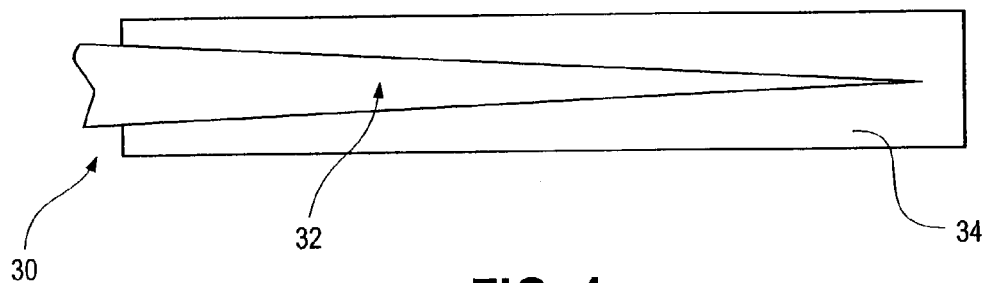
FIG. 3 is a cross-sectional view of a coupling zone-end of an elongated cone-end nib having an elongated cone-shaped coupling portion shown with a reservoir.

A variation of a cone-end nib 30 is shown in FIG. 3. FIG. 3 is a cross-sectional view of a coupling zone-end of an elongated cone-end nib 30 having an elongated cone-shaped coupling portion 32 shown with a reservoir 34, wherein the coupling portion 32 of the coupling zone-end is relatively longer and is configured to extend relatively further into the reservoir 34. For example, the coupling portion 32 can extend the entire length of the reservoir.

Figure 4:
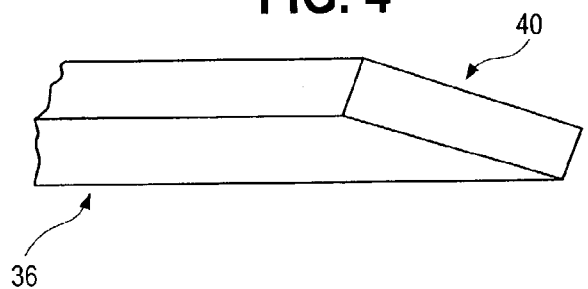
FIG. 4 is an elevation view of a coupling zone-end of a chisel-end nib having a chisel-shaped coupling portion.
Figure 5:
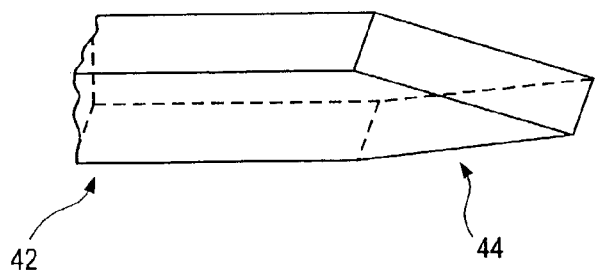
FIG. 5 is an elevation view of a coupling zone-end of a wedge-end nib having a wedge-shaped coupling portion.
Figure 6:
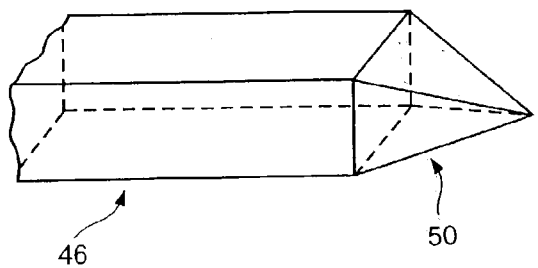
FIG. 6 is an elevation view of a coupling zone-end of a pyramid-end nib having a pyramid-shaped coupling portion.

FIG. 4 is an elevation view of a coupling zone-end of a chisel-end nib 36 having a chisel-shaped coupling portion 40. FIG. 5 is an elevation view of a coupling zone-end of a wedge-end nib 42 having a wedge-shaped coupling portion 44. FIG. 6 is an elevation view of a coupling zone-end of a pyramid-end nib 46 having a pyramid-shaped coupling portion 50. In the configurations shown in FIGS. 4 to 6, each coupling portion can be about 1 cm to about 2.5 cm in length, for example. The coupling portion of the nib can be ground on one or more surfaces to expose capillary channels in the nib. The invention is not limited to the use of any particular size or shape of coupling portion on the nib, and other suitable nib shapes and sizes can be selected by a person of ordinary skill in the art.

EXAMPLES

The following examples are provided to illustrate the invention but are not intended to limit the scope of the invention.

Example 1

Silver Ink 1

A silver ink was prepared by blending the components identified below in the amounts shown, the balance being water.

| Component | Function | Amount |
|---|---|---|
| NPW 2900 aluminum powder (10 µm) | metallic pigment | 15 wt. % |
| DANTOIN 739 | film-forming resin | 19 wt. % |
| PROXEL GXL | preservative | 0.1 wt. % |
| triethanol amine | pH-adjusting agent | 0.5 wt. % |

The ink had a measured viscosity of 2.61 cP. The ink was loaded into a marker including a polyester fiber reservoir coupled to an acrylic nib. The marker dispensed the metallic ink from the reservoir, through the nib, onto a substrate via capillary action.

Example 2

Silver Ink 2

A silver ink was prepared by blending the components identified below in the amounts shown, the balance being water.

| Component | Function | Amount |
|---|---|---|
| NPW 2900 aluminum powder (10 μm) | metallic pigment | 15 wt. % |
| DANTOIN 739 | film-forming resin | 19 wt. % |
| PROXEL GXL | preservative | 0.1 wt. % |
| triethanol amine | pH-adjusting agent | 0.5 wt. % |
| xanthan gum | anti-settling agent | 0.5 wt. % of a 1 wt. % solution in water |

The ink had a measured viscosity of 11.3 cP. The ink was loaded into a marker including a polyester fiber reservoir coupled to an acrylic nib. The marker dispensed the metallic ink from the reservoir, through the nib, onto a substrate via capillary action.

Example 3

Gold Ink 1

A gold ink was prepared by blending the components identified below in the amounts shown, the balance being water.

| Component | Function | Amount |
|---|---|---|
| NPW 2900 aluminum powder (10 μm) | metallic pigment | 10 wt. % |
| DANTOIN 739 | film-forming resin | 13.4 wt. % |
| HOSTAFINE Yellow HR | tinting agent | 20.1 wt. % |
| monomethanol amine phosphate | linking agent | 0.34 wt. % |
| PROXEL GXL | preservative | 0.07 wt. % |
| triethanol amine | pH-adjusting agent | 0.34 wt. % |
| xanthan gum | anti-settling agent | 0.34 wt. % of a 1 wt. % solution in water |

The ink had a measured viscosity of 4 cP. The ink was loaded into a marker including a polyester fiber reservoir coupled to an acrylic nib. The marker dispensed the metallic ink from the reservoir, through the nib, onto a substrate via capillary action.

Example 4

Gold Ink 2

A gold ink was prepared by blending the components identified below in the amounts shown, the balance being water.

| Component | Function | Amount |
|---|---|---|
| NPW 2900 aluminum powder (10 μm) | metallic pigment | 10 wt. % |
| DANTOIN 739 | film-forming resin | 13.4 wt. % |
| HOSTAFINE Yellow HR | tinting agent | 20.1 wt. % |
| STYLEZE 2000 | linking agent | 3.4 wt. % of a 10% solution in water |
| PROXEL GXL | preservative | 0.1 wt. % |

-continued

| Component | Function | Amount |
|---|---|---|
| triethanol amine | pH-adjusting agent | 0.5 wt. % |
| xanthan gum | anti-settling agent | 0.34 wt. % of a 1 wt. % solution in water |

The ink had a measured viscosity of 10.6 cP. The ink was loaded into a marker including a polyester fiber reservoir coupled to an acrylic nib. The marker dispensed the metallic ink from the reservoir, through the nib, onto a substrate via capillary action.

The foregoing description is given for clearness of understanding only, and no unnecessary limitations should be understood therefrom, as modifications within the scope of the invention may be apparent to those having ordinary skill in the art.

What is claimed is:

1. An aqueous metallic ink, comprising an aqueous dispersion of a metallic pigment having an average particle size in a range of about 2 μm to about 15 μm, a film-forming resin comprising a hydantoin-formaldehyde co-polymer, an organic pigment, and an amphiphilic linking agent that links the organic pigment to the metallic pigment, wherein said ink has a pH in the range of about 6 to about 9 and wherein said metallic pigment comprises about 7.5 wt. % to about 20 wt. % of said ink, based on the total weight of the ink.

2. The ink of claim 1, wherein said metallic pigment has an average particle size in a range of about 5 μm to about 12 μm.

3. The ink of claim 1, wherein said resin comprises dimethylhydantoin-formaldehyde.

4. The ink of claim 1, comprising a sufficient amount of a pH adjusting agent to maintain the pH of the ink in the range of 6 to 9.

5. The ink of claim 4, wherein said pH adjusting agent comprises a compound selected from the group consisting of triethanol amine, aminomethyl propanol, and combinations thereof.

6. The ink of claim 1, further comprising an anti-settling agent in an amount in a range of about 0.001 wt. % to about 0.01 wt. %. based on the total weight of the ink.

7. The ink of claim 1, further comprising a preservative.

8. The ink of claim 1, wherein said ink has a viscosity in a range of 2.5 centinoises (cP) to 80 cP.

9. A marking instrument, comprising a reservoir for storing ink joined in capillary coupling relation to a porous nib, and an ink according to claim 1 disposed in said reservoir.

10. The marking instrument of claim 9, wherein said reservoir comprises a polyester fiber reservoir having a density less than about 1 g/cm$^3$.

11. The marking instrument of claim 9, wherein said nib comprises porous, substantially linear acrylic fiber.

12. The marking instrument of claim 11, wherein the porosity of the nib is in a range of about 55% by volume to about 80% by volume of voids.

13. The marking instrument of claim 9, wherein said nib comprises a porous, substantially linear fiber, said instrument further comprising a coupling zone wherein the surface area of exposed fiber ends is greater than the cross-sectional area of the nib.

14. A marking instrument comprising a polyester fiber reservoir having a density less than about 1 g/cm$^3$ disposed in capillary coupling relation to a porous, substantially linear acrylic fiber nib, and an aqueous metallic ink according to claim 1 disposed in said reservoir, wherein said metallic pigment has an average particle size in a range of about 5 μm to about 12 μm, said film-forming resin comprises dimethyi-hydantoin-formaldehyde, and said aqueous metallic ink further comprises a pH adjusting agent selected from the group consisting of triethanol amine, aminomethyl propanol, and combinations thereof.

15. The ink of claim 1, wherein said metallic pigment has an average particle size in a range of about 5 μm to about 9 μm.

16. The ink of claim 1, wherein said metallic pigment comprises a metallic pigment selected from the group consisting of aluminum pigments, copper pigments, bronze pigments, oxides thereof, anodizes thereof, and combinations of any of the foregoing.

17. The ink of claim 1, wherein said metallic pigment is flaked.

18. The ink of claim 1, wherein said resin is present in an amount about 10 wt. % to about 40 wt. %, based on the total weight of the ink.

19. The ink of claim 1, wherein the ratio of said metallic pigment to said film-forming resin is in a range of about 0.2 to 0.6.

20. The ink of claim 1, wherein the ratio of the sum of said metallic pigment and said organic pigment to said film-forming resin is in a range of about 0.2 to 0.6.

21. The ink of claim 1, wherein said metallic pigment has an average particle size in a range of about 2 μm to less than about 12 μm.

22. The ink of claim 1, wherein said organic pigment comprises about 2 wt. % to about 30 wt. % of the ink, based on the total weight of the ink.

23. An aqueous metallic ink, comprising an aqueous dispersion of a metallic pigment having an average particle size in a range of about 2 μm to about 15 μm, a film-forming resin comprising a hydantoin-formaldehyde co-polymer, an organic pigment, a dye, and a linking agent, wherein said ink has a pH in the range of about 6 to about 9 and wherein said metallic pigment comprises about 7.5 wt. % to about 20 wt. % of said ink, based on the total weight of the ink.

24. The ink of claim 23, wherein a combination of said organic pigment and said dye comprises about 2 wt. % to about 30 wt. % of the ink, based on the total weight of the ink.

25. An aqueous metallic ink, comprising an aqueous dispersion of a metallic pigment having an average particle size in a range of about 2 μm to about 15 μm, a film-forming resin comprising a hydantoin-formaldehyde co-polymer, an organic pigment, and a linking agent, wherein said ink has a pH in the range of about 6 to about 9 and wherein said metallic pigment comprises about 7.5 wt. % to about 20 wt. % of said ink, based on the total weight of the ink, and wherein said linking agent is selected from the group consisting of amphiphilic copolymers, multifunctional carbodiimides, phosphoric acid salts, and combinations thereof.

26. The ink of claim 25, wherein said linking agent comprises an amphiphilic copolymer.

* * * * *

UNITED STATES PATENT AND TRADEMARK OFFICE
CERTIFICATE OF CORRECTION

| | |
|---|---|
| PATENT NO. | : 7,135,507 B2 |
| APPLICATION NO. | : 10/298719 |
| DATED | : November 14, 2006 |
| INVENTOR(S) | : Martin N. Sexton |

Page 1 of 1

It is certified that error appears in the above-identified patent and that said Letters Patent is hereby corrected as shown below:

<u>On the Title Page:</u>

Item [75], "Villa Park" should be -- Sugar Grove --.

At Column 8, line 45, "%." should be -- %, --.

At Column 8, line 48, "centinoises" should be -- centipoises --.

At Column 9, line 5, "dimethyi-" should be -- dimethyl- --.

Signed and Sealed this

Twenty-ninth Day of April, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,135,507 B2 | Page 1 of 1 |
| APPLICATION NO. | : 10/298719 | |
| DATED | : November 14, 2006 | |
| INVENTOR(S) | : Martin N. Sexton | |

It is certified that error appears in the above-identified patent and that said Letters Patent is hereby corrected as shown below:

On the Title Page:

item (75), "Villa Park" should be -- Sugar Grove --.

At Column 8, line 45, "%." should be -- %, --.

At Column 8, line 48, "centinoises" should be -- centipoises --.

At Column 9, line 5, "dimethyi-" should be -- dimethyl- --.

Signed and Sealed this

Thirteenth Day of May, 2008

JON W. DUDAS
*Director of the United States Patent and Trademark Office*